Dec. 14, 1965   G. P. SCHIVLEY, JR   3,222,886
SPINDLE BLADE
Filed May 2, 1963                                5 Sheets-Sheet 2

INVENTOR.
GEORGE P. SCHIVLEY, JR.
BY
ATTORNEY

Dec. 14, 1965    G. P. SCHIVLEY, JR    3,222,886
SPINDLE BLADE

Filed May 2, 1963    5 Sheets-Sheet 3

INVENTOR.
GEORGE P. SCHIVLEY, JR.
BY
ATTORNEY

Dec. 14, 1965 G. P. SCHIVLEY, JR 3,222,886
SPINDLE BLADE
Filed May 2, 1963 5 Sheets-Sheet 4

INVENTOR.
GEORGE P. SCHIVLEY, JR.
BY
ATTORNEY

United States Patent Office 3,222,886
Patented Dec. 14, 1965

3,222,886
SPINDLE BLADE
George P. Schivley, Jr., Bethlehem, Pa., assignor to Ingersoll-Rand Company, New York, N.Y., a corporation of New Jersey
Filed May 2, 1963, Ser. No. 278,520
10 Claims. (Cl. 64—26)

This invention relates to impulse tools and more particularly to an improved spindle blade for such impulse tools.

Heretofore, impulse tools have been of two types first impulse wrenches and secondly as a source of fluid impulses, both types being disclosed in U.S. patent applications, Serial No. 115,714, filed June 8, 1961, now abandoned, by D. K. Skoog; Serial No. 158,838, now Pat. No. 3,116,617, filed December 12, 1961, by D. K. Skoog; and Serial No. 244,151, filed December 12, 1962, by D. K. Skoog et al. and assigned to the same assignee as the present application.

When the impulse tool is employed as an impulse wrench for applying a predetermined torque to an object, such as a threaded fastener, the impulse tool comprises:

(a) housing means adapted to contain a fluid (such as oil), (b) spindle means in the housing means and in the fluid, (c) drive means operatively associated with one of the housing means and the spindle means for causing relative rotary movement between the housing means and the spindle means, (d) the other of the housing means and the spindle means being adapted to engage the fastener, (e) the spindle means being operable during a portion of each revolution of the relative rotary movement to dynamically seal off a portion of the fluid so that the pressure in that portion of the fluid and on the spindle means increases thereby causing the other of the housing means and the spindle means to rotate with respect to the one and to apply a torque to the object.

When the impulse tool is utilized as apparatus connected to a conventional tool for driving the tool by fluid impulses, the apparatus comprises:

(a) a stationary casing means, (b) housing means within the casing means and adapted to contain a fluid (such as oil), (c) spindle means mounted in the housing means and in the fluid, (d) one of the spindle means and housing means being secured to the casing means, (e) one of the spindle means and housing means being provided with passage means in communication with the other of the spindle means and housing means extending through the one and to the tool, (f) drive means connected to the other of the housing means and spindle means for causing rotation of the other with respect to the casing means, (g) the spindle means being operative during a portion of each revolution of the relative rotation to dynamically seal off a portion of the fluid so that the pressure in that portion of the fluid and on the spindle means increases thereby causing a pulse of fluid to flow through the passage means to the tool.

In conventional impulse tools there is premature undesirable slowing down of the driven member (either the housing means and spindle means) just prior to the time when the driven member engages the land or spindle blade in the other of the housing means and spindle means. In addition there is an excessive amount of deceleration of the driven member (which constitutes the principal inertia of the impulse tool) during impact. The net effect of this deceleration is the reduction of the ultimate torque (ft. lbs.) and impulse horsepower (inch lbs./sec.). Further after impulse excessive time is required to accelerate the driven member.

It is the general object of the present invention to avoid and overcome the foregoing and other difficulties of and objections to prior art practices by the provision of an improved spindle blade for an impulse tool, which spindle blade will cause the impact tool to impact at the highest speed possible (consistent with the capabilities of the drive means, such as an air motor); will provide an accurate abrupt means of controlling the cut off point and initiation point of the bypass means thereby preventing excessive deceleration of the impulse tool before and during impulse; will produce an impulse horsepower which is about three times the impulse horsepower of conventional impulse tools; and will shorten the time required to re-accelerate the driven member after the impulse.

The aforesaid objects of the present invention, and other objects which will become apparent as the description proceeds, are achieved by providing an improved spindle blade for an impulse tool having a housing means adapted to contain a fluid, spindle means in the housing means and in the fluid, and drive means operatively associated with one of the housing means and the spindle means for causing relative rotary movement between the housing means and the spindle means, the spindle blade being disposed in one of the housing means and spindle means and having a tapered sealing portion of reduced cross sectional area for abruptly cutting off and initiating the bypass flow before and after impulsing.

For a better understanding of the present invention reference should be had to the accompanying drawings, wherein like numerals of reference indicate similar parts throughout the several views and wherein.

Although the principles of the present invention are broadly applicable to impulse tools utilized as impulse wrenches or as a source of fluid impulses for driving a conventional tool, the present invention is particularly adapted for use in conjunction with an impulse wrench and hence it has been so illustrated and will be so described.

Figure 1:
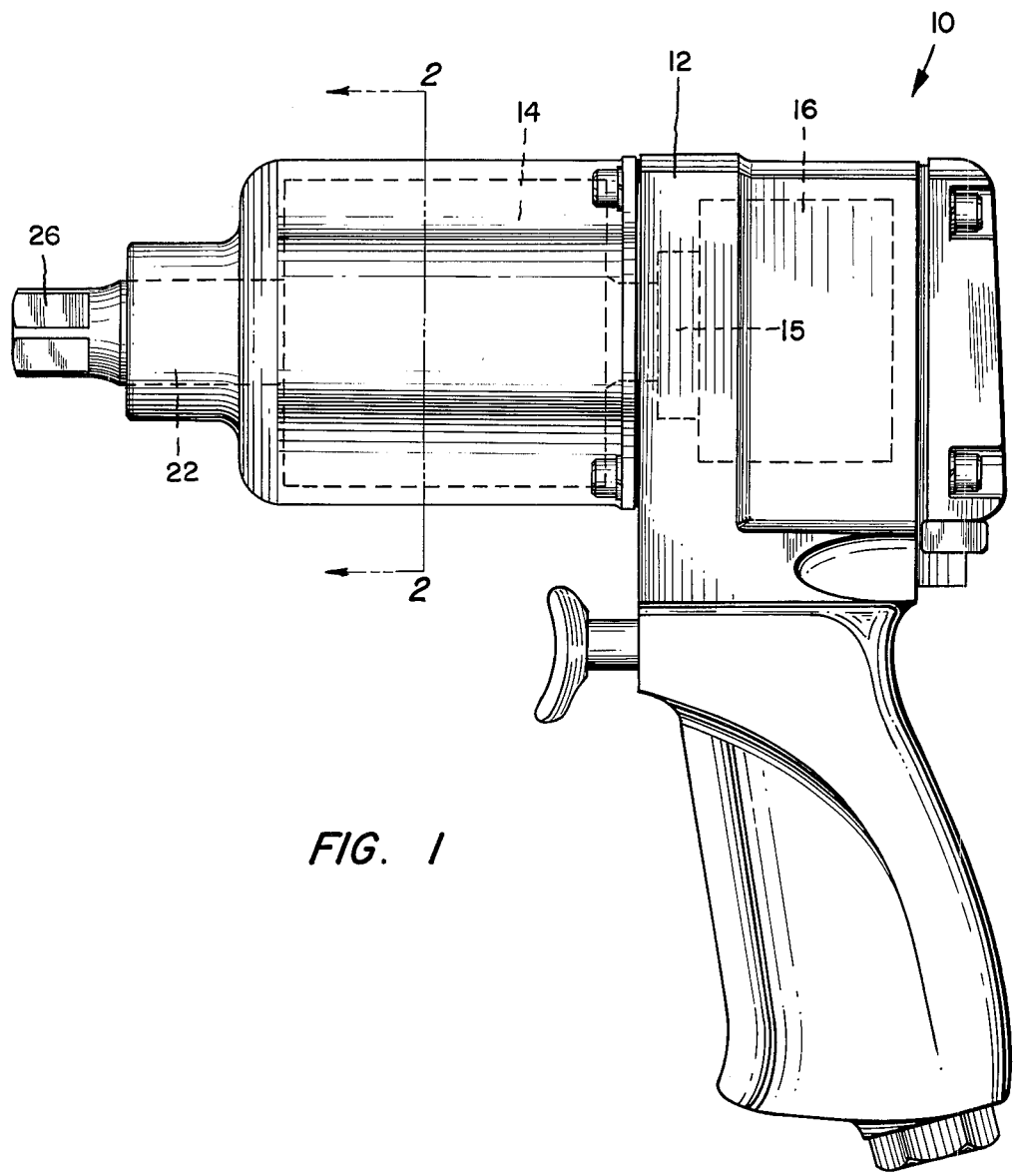
FIGURE 1 is a side elevational view of an impulse tool incorporating the improved spindle blade of the present invention.

With specific reference to the form of the present invention illustrated in the drawings, and referring particularly to FIGURE 1, an impulse tool of the type disclosed in the above U.S. application, Serial No. 158,838 is indicated generally by the reference numeral 10.

Since the impulse tool 10 per se forms no part of the present invention it is deemed sufficient to say that such impulse tool 10 has a casing means, such as an outer casing 12, and a housing means, such as the inner housing 14. This inner housing 14 is provided with an eccentric cavity 18 (FIG. 2) adapted to contain a fluid, such as oil F. Drive means, such as an air motor 16 (FIGURE 1) or the like, is connected by a coupling means 15 to one of the inner housing 14 and spindle means (such as spindle 22) rotatably mounted on the inner housing 14 about the center 24. In this case the coupling means 15 is connected to the inner housing 14 for causing rotation of the inner housing 14 with respect to the outer casing 12. The other of the inner housing 14 and spindle 22 (in this case the spindle 22) is connectable by means of a square drive 26 to a socket (not shown) for engaging an object, such as a threaded fastener (not shown). The center of the eccentric cavity 18 is at 20 and the center of the inner housing is at 24.

SPINDLE BLADE

Figure 2:
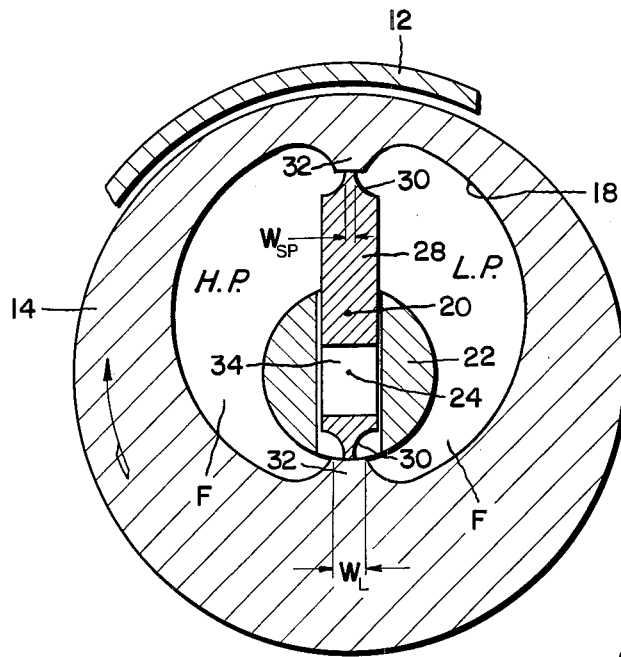
FIGURE 2 is a transverse sectional view along the line 2—2 of FIGURE 1 in the direction of the arrows showing the improved spindle blade of the present invention in the spindle and the inner housing being rotated.
Figure 3:
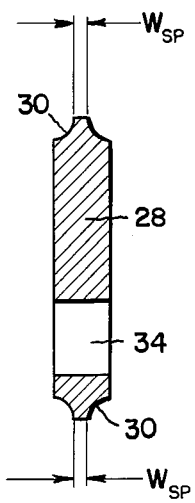
FIGURE 3 is a transverse sectional view of the improved spindle blade.

As shown in FIGURE 2 the spindle 22 has a through type spindle blade 28 having sealing portions 30 provided with a contact width $W_SP$. The sealing portions 30 cooperate with lands 32 having a contact width $W_L$. The spindle blade 28 is provided with a leakage or bypass slot 34 for limiting the impulses/revolution of the inner housing 14 to one impulse/revolution. In FIGURE 2 the sealing portion 30 is concave arcuate.

Operation

Since the operation of the impulse tool 10 is explained in the above-mentioned U.S. patent applications, Serial Nos. 115,714, 158,838 and 244,151, it is deemed sufficient to say that ideally the closing of the leakage path between the high pressure portion HP and low pressure portion LP of the cavity 18 should be a step function to achieve the highest output of the impulse tool 10. Furthermore, once the leakage path is closed, there is a particular point at which it should be reopened so that the torque generated by the impulse can be obtained with a minimum deceleration of the impulse tool 10. In other words, the impulse tool 10 is proportioned so that optimum performance can be achieved.

In the impulse tool 10 it is a fact that the period of time during which the impulse occurs is quite small and consequently the total angular travel of the spindle blade 28 is small. For this reason it is necessary that the spindle blade thickness ($W_SP$) of the sealing portion 30 of the spindle blade 28 be thin. If the sealing portion 30 of the spindle blade 28 is not kept thin then any attempt to regulate the point where the leakage path is reopened (end of impulse) by regulating the width ($W_L$) of the land 32 will be overshadowed by the spindle blade thickness ($W_SP$).

In order to reconcile the test data the following empirical equations were developed relating to calculated tool impulse horsepower (I.H.P.) in inch lbs./sec. to lag screw rundown time $t_L$ in seconds as measured. To test the impulse tool 10 a ½" lag screw 40 (FIGURE 11) was started in a drilled hole 42 in a wooden log 44 and the time taken by the impulse tool 10 to set the lag screw 40 (lag screw rundown time $t_L$) measured.

Eq. (1) $$\text{I.H.P.} = \frac{102 \overline{T}_R}{t_L}$$

and

Eq. (2) $$\text{I.P.H.} = \left(\frac{\overline{r} A_B}{t_0} \int_0^{t_0} P\, dt\right) \overline{\frac{d\theta}{dt}}$$

where

Figure 11:
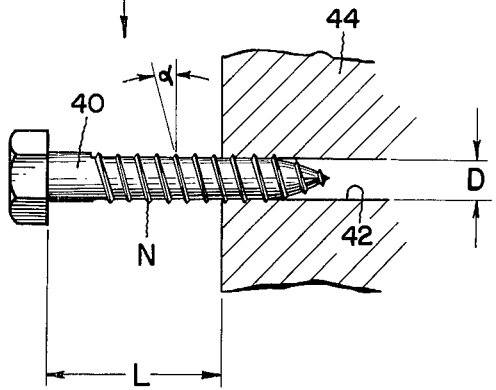
FIGURE 11 is a fragmentary side elevational view (partially in section) of a lag screw penetrating a log.

I.H.P. = impulse horsepower (inch-lbs./sec.);

$\overline{r}$ = distance from the longitudinal axis of the spindle 22 to the center of fluid pressure of the spindle blade 28 measured in inches;

$A_B$ = effective exposed pressure area of the spindle blade 28 measured in square inches;

$t_0$ = time for one complete cycle of the impulse tool 10 in seconds;

P = fluid instantaneous pressure differential between high pressure portion HP and low pressure portion LP in the eccentric cavity 18 of the impulse tool 10;

$\overline{\frac{d\theta}{dt}}$ = time average angular speed of the impulse tool 10 in radians/sec;

t = time measured in seconds;

102 = a constant relating to the size, threads helix angle of the lag screw 40 (FIGURE 11);

$\overline{T}_R$ = time-average restraining torque measured in lb.-inches; and $t_L$ = lag screw rundown time in seconds Utilizing Eq. 2 impulse horsepower (inch lbs./sec.) I.H.P. was calculated using the theory of operation of the impulse tool 10, which I.H.P. values are listed in Table I.

Figure 4:
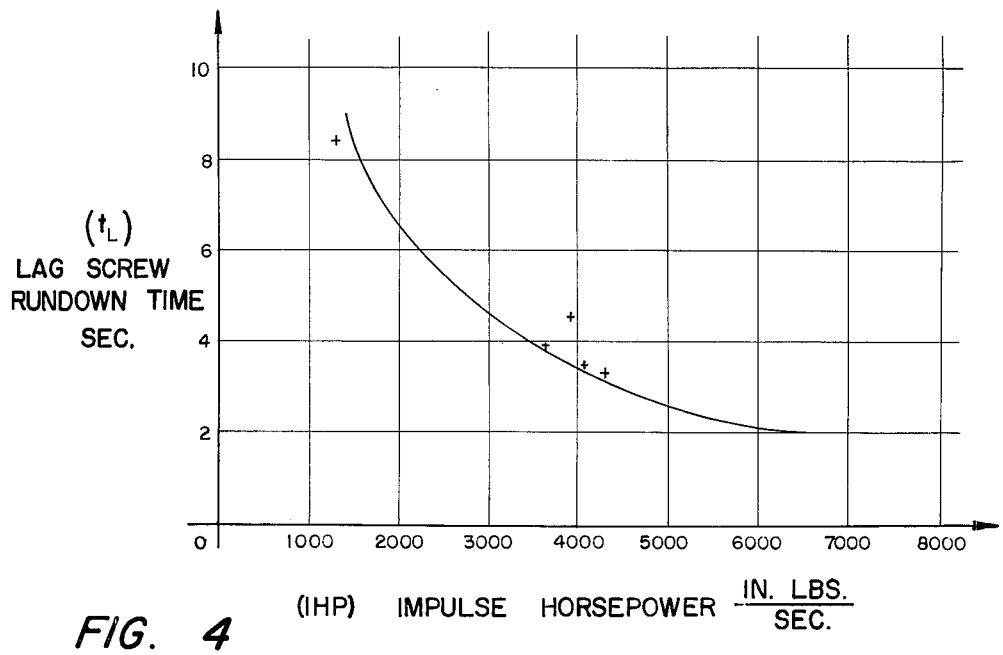
FIGURE 4 is a graph showing the calculated impulse horsepower and experimental lag screw rundown time.

Utilizing the calculated I.H.P. values and the measured $t_L$ values, the points in FIGURE 4 were plotted, presuming $\overline{T}_R$ to be a constant (i.e. 131 inch lbs.).

The hyperbolic curve shown in FIGURE 4 represents the average curve for the I.H.P. and $\overline{T}_L$ point plotted.

TABLE I

| Test No. | Sealing Portion Width $W_SP$ (inches) | Land Width $W_L$ inches | Impulse Horsepower (inch lbs./sec.) I.H.P. (calculated) | Lag Screw Rundown (secs.) $t_L$ Measure |
|---|---|---|---|---|
| 1* | .100 | .095 | 1,320 | 8.50 |
| 2 | .030 | .058 | 3,952 | 4.48 |
| 3 | .020 | .070 | 4,055 | 3.60 |
| 4 | .020 | .070 | 4,304 | 3.53 |
| 5 | .020 | .070 | 3,666 | 3.97 |

* Note: Conventional impulse tool of the type disclosed in U.S. applications, Serial Nos. 115,714, 158,838, and 244,151.

The justification for utilizing a hyperbolic curve (FIGURE 4) to represent the avearge of the data, is shown in the following derivation.

DERIVATION OF RELATIONSHIP FOR CORRELATING IMPULSE TOOL PERFORMANCE

Figure 10A:
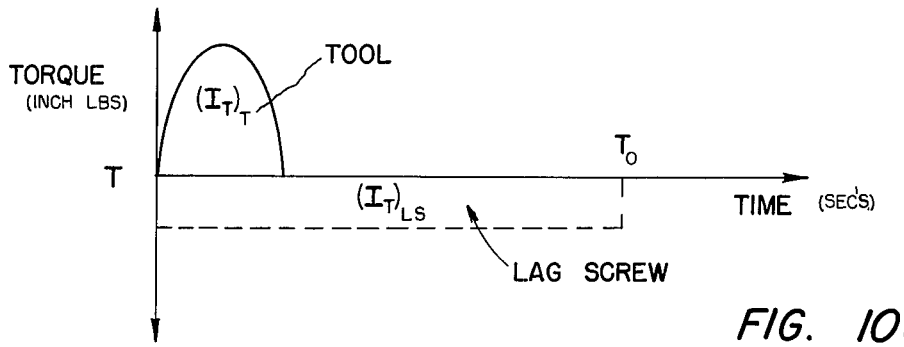
FIGURE 10a is a graph of torque (inch-lbs.) versus time (seconds) showing the torque impulse which the tool delivers and the torque impulse absorbed by the lag screw assuming that the lag screw has some velocity at the end of a complete cycle (time to)
Figure 10B:
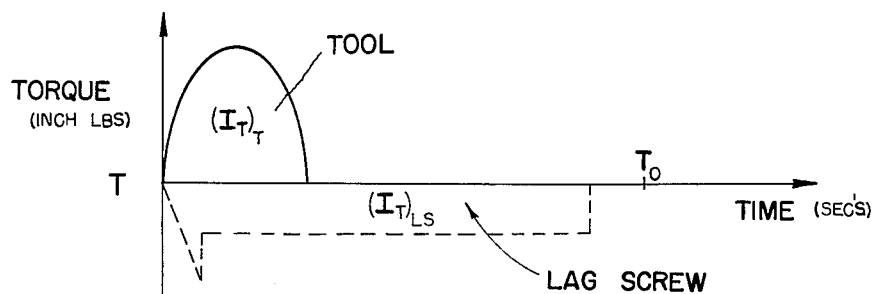
FIGURE 10b is a graph similar to FIGURE 10a except that the lag screw is assumed to have come to rest some time before the end of a complete cycle (time to)

Referring to FIGURES 10a and 10b, the torque impulse ($I_t$), is defined as:

$$I_t = \int T dt \qquad (3)$$

where:

$I_t$=torque impulse (inch-lb.-sec.)
$T$=torque (inch-lb.)
$t$=time (sec.)

When the lag screw 40 is driven into the log 44 two torques, and consequently two impulses exist. These are:

$(I_t)_t$=torque impulse of tool (10) (inch-lb.-sec.)
$(I_t)_R$=torque impulse of log 44 (inch-lb.-sec.)

Using Equation 3 and considering the geometry and operation of the impulse tool (10), it can be shown that:

$$(I_t)_t = A\bar{r}_b \int_0^{t_0} P dt \qquad (4)$$

Likewise, if we call $T_R$ the instantaneous torque of the log 44 on the lag screw 40 then using Equation 3:

$$(I_t)_R \int_0^{t_0} T_R dt \qquad (5)$$

If we divide both Equations 4 and 5 by two, then the result is the time-average value of the driving torque and opposing torque acting on the lag screw 40 respectively:

$$(\bar{T})_t = \frac{\bar{r} A_b}{t_0} \int_0^{t_0} P dt \qquad (6a)$$

$$(\bar{T})_R = \frac{1}{t_0} \int_0^{t_0} T_R dt \qquad (6b)$$

Where:

$(\bar{T})_t$=the driving time-average torque supplied by the impulse tool (10) (inch-lb.)
$(\bar{T})_R$=the opposing time-average torque of log 44 on lag screw 40 (inch-lb.)

The general definition of horsepower is:

H.P.=horsepower=(time-average torque)
(time-average speed)

Using this definition and recognizing that horsepower delivered equals horsepower absorbed, the following equality may be written, utilizing Equations 6a and 6b:

$$\left[ \frac{\bar{r} A_b}{t_0} \int_0^{t_0} P dt \right] \overline{d\theta}/dt = \left[ \frac{1}{t_0} \int_0^{t_0} T_R dt \right] B \qquad (7)$$

Where:

$B$=time-average speed of lag screw (40), (rad./sec.)

Now for a given lag screw 40 $B$ can be expressed as:

$$B = \frac{K}{t_L} \qquad (8)$$

Where:

$K$=a constant depending only on the detailed geometry of the lag screw (40), (rad.)

Introducing Equation 8 into Equation 7 and using Equation 6b, Equation 7 becomes:

$$\left[ \frac{\bar{r} A_b}{t_0} \int_0^{t_0} P dt \right] \frac{\overline{d\theta}}{d_L} = (\bar{T})_R \frac{K}{t_L} \qquad (9)$$

This Equation 9 shows that Equation 1 and Equation 2 are ideally equal to each other and justifies using a hyperbolic curve (FIGURE 4) to represent the average of the data plotted.

ALTERNATIVE EMBODIMENTS

Figure 5:
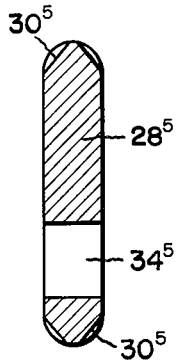
FIGURE 5 is a view similar to FIGURE 3 showing an alternative embodiment of the spindle blade having a straight sided tapered sealing portion.
Figure 6:
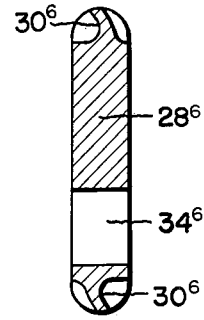
FIGURE 6 is a view similar to FIGURES 3 and 5 showing a spindle blade having a concave arcuate sealing portion offset from the logitudinal axis of the spindle blade.

It will be understood by those skilled in the art that alternatively (FIGURE 5) the tapered sealing portion $30^5$ of the spindle blade $28^5$ may be straight sided, whereas in FIGURE 6 the tapered sealing portion $30^6$ of the spindle blade $28^6$ is concave arcuate and is offset from the longitudinal axis of the spindle blade $28^6$.

Figure 7:
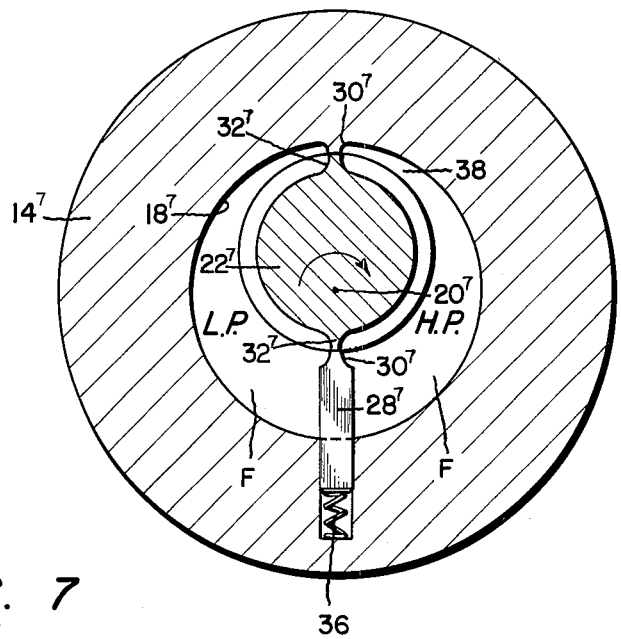
FIGURE 7 is a view similar to FIGURE 2 showing the spindle blade in the inner housing and the spindle being rotated.

In FIGURE 7 the spindle $22^7$ is being rotated about the center $20^7$ and the blade $28^7$ is reciprocable in the inner housing $14^7$ and is biased by a spring 36 into engagement with the land $32^7$ on the spindle $22^7$. Bypass slots 38 are utilized in cavity $18^7$ as in FIGURE 2 of U.S. patent application, Serial Nos. 115,714, and 158,838.

It will be appreciated that if the inner housing $14^7$ is rotated a centrifugal sealing device of the type disclosed in U.S. Patent 3,182,470 issued May 11, 1965 to George N. Smith would be employed with the spindle blade $28^7$.

Figure 8:
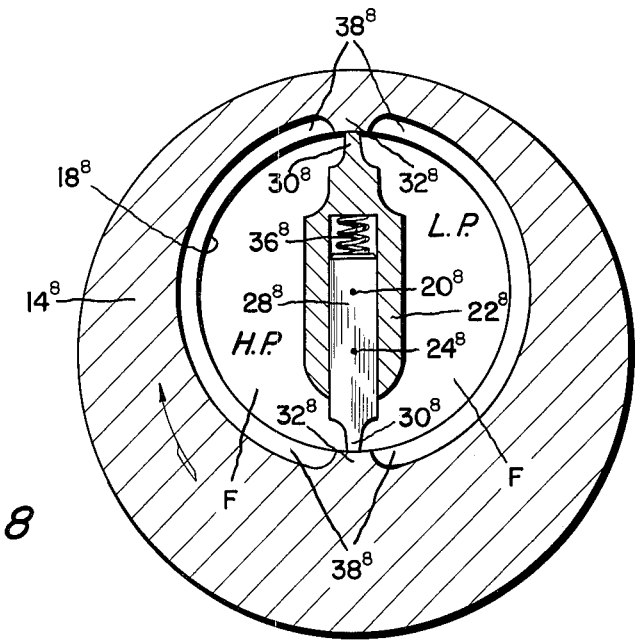
FIGURE 8 is a view similar to FIGURES 2 and 7 showing the spindle blade in the spindle and with the inner housing rotating.

In FIGURE 8 the spindle blade $28^8$ (having tapered sealing portion $30^8$) engages lands $32^8$ on the inner housing $14^8$, which housing $14^8$ is rotatable about center $24^8$.

Figure 9:
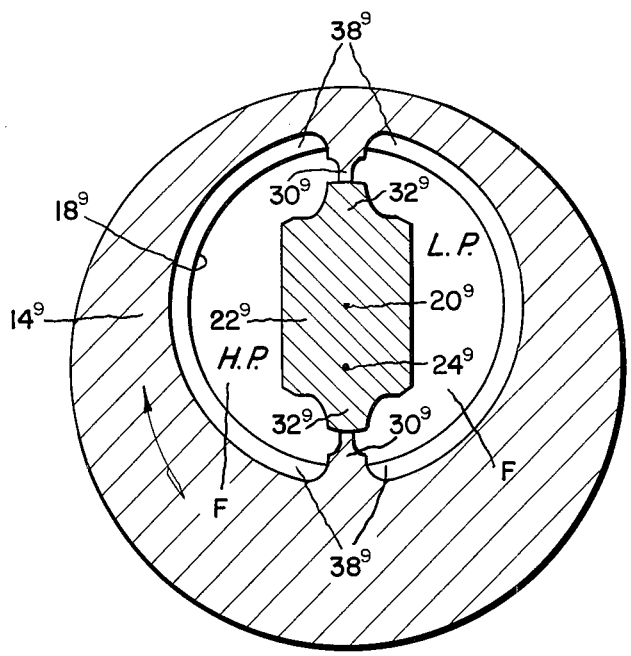
FIGURE 9 is a view similar to FIGURES 2 and 7 and 8 with the sealing portions on the inner housing and the lands on the spindle and showing the inner housing rotating.

In FIGURE 9 the sealing portions $30^9$ are on the inner housing $14^9$ rotatable about center $24^9$ and the lands $32^9$ are on the spindle $22^9$.

Further all of the spindle blades 28, $28^5$, $28^6$ can be employed in the embodiments shown in FIGURES 7, 8 and 9.

It will be recognized by those skilled in the art that the objects of the present invention have been achieved by providing an improved spindle blade for an impulse tool which spindle blade causes the impact tool to impact at the highest possible speed; provides an accurate abrupt means of controlling the cut-off point thereby preventing excessive deceleration of the impulse tool during impact; produces an impulse horsepower which is about three times the impulse horsepower of conventional impulse tools; and reduces the time required to reaccelerate the driven member after the impulsing action ceases.

While in accordance with the patent statutes a preferred and alternative embodiments of the present invention has been illustrated and described in detail, it is to be particularly understood that the invention is not limited thereto or thereby.

I claim:

1. In an impulse tool having a housing means defining a cavity adapted to contain a fluid, spindle means in said housing means and the fluid, and drive means operatively associated with one of said means for causing relative rotation between said housing and spindle means, said housing and spindle means each having at least one sealing portion cooperating with the sealing portion of the other to divide said cavity into a high pressure portion and a low pressure portion during a relatively short portion of each revolution of relative rotation between said housing and spindle means for causing an impulse; and
   (a) at least one of the sealing portions being of reduced area defined by generally converging walls adjacent its terminal edge, said walls terminating at said edge in closely adjacent but spaced apart relation forming parallel lines of juncture bounding the reduced area for abruptly cutting off and initiating bypass flow before and after causing an impulse.

2. In an impulse tool in accordance with claim 1, wherein said converging walls are straight sided.

3. In an impulse tool in accordance with claim 1, wherein said converging walls are arcuate.

4. In an impulse tool in accordance with claim 1, wherein said converging walls are concave arcuate.

5. In an impulse tool in accordance with claim 1, wherein said converging walls are concave arcuate and are offset from the longitudinal axis of said spindle blade.

6. In an impulse tool in accordance with claim 1, wherein one of said housing and spindle means includes a blade to provide said sealing portion of reduced area, and the thickness of said blade is larger than said area.

7. In an impulse tool in accordance with claim 6, wherein said tapered blade sealing portion is straight sided.

8. In an impulse tool in accordance with claim 6, wherein said converging walls are arcuate.

9. In an impulse tool in accordance with claim 6, wherein said converging walls are concave arcuate.

10. In an impulse tool in accordance with claim 6, wherein said converging walls are concave arcuate and are offset from the longitudinal axis of said spindle blade.

References Cited by the Examiner
UNITED STATES PATENTS

| | | | |
|---|---|---|---|
| 2,881,708 | 4/1959 | Wernert | 103—137 X |
| 2,974,700 | 3/1961 | Waters | 103—137 X |
| 3,116,617 | 1/1964 | Skoog | 192—58 X |

DON A. WAITE, *Primary Examiner.*

DAVID J. WILLIAMOWSKY, *Examiner.*

A. T. McKEON, *Assistant Examiner.*